Sept. 20, 1966 L. T. DE VORE 3,274,403

GASEOUS THERMOCOUPLE UTILIZING A SEMICONDUCTOR

Filed May 26, 1961

INVENTOR.
LLOYD T. DEVORE
BY M. Jabin
ATTORNEY 3,274,403

GASEOUS THERMOCOUPLE UTILIZING A SEMICONDUCTOR

Lloyd T. De Vore, Santa Barbara, Calif., assignor to Hoffman Electronics Corporation, a corporation of California Filed May 26, 1961, Ser. No. 112,969
6 Claims. (Cl. 310—4)

The present invention relates to gaseous thermocouples, and more particularly to gaseous thermocouples in which the active element is a gas, operating between different temperatures on opposite sides of a p-n junction.

A gaseous thermocouple can be used as a thermoelectric generator for converting heat into electric current. Different types of such gaseous thermocouples have been devised, but they are either heavy and bulky, contain elements that deteriorate or become contaminated easily, are not capable of operating at high temperatures for more than a brief period of time, or require exotic or rare materials that are expensive.

It is an object of the present invention to provide a novel gaseous thermocouple.

It is another object of the present invention to provide a lightweight and inexpensive gaseous thermocouple that contains components that do not deteriorate or become contaminated easily, and that is capable of extended operation at high temperatures.

According to one embodiment of the present invention, a gaseous thermocouple comprises a chamber filled with an easily ionized gas and divided into two compartments by a semipermeable diaphragm that is made of a thin semiconductor having a p-n junction. The semiconductor is pierced by numerous small holes or perforations. Each compartment contains an electrode, and each electrode is connected to an external load. Current can pass through the load when one compartment is heated to make it hotter than the other compartment and hot enough to form some gas ions and electrons. Such a thermocouple can approach the Carnot cycle limit in efficiency.

The features of the present invention which are believed to be novel are set forth with particularity in the appended claims. The present invention, both as to its organization and manner of operation, together with further objects and advantages thereof, may best be understood by reference to the following description taken in connection with the accompanying drawings, in which:

Figures 1, 2:
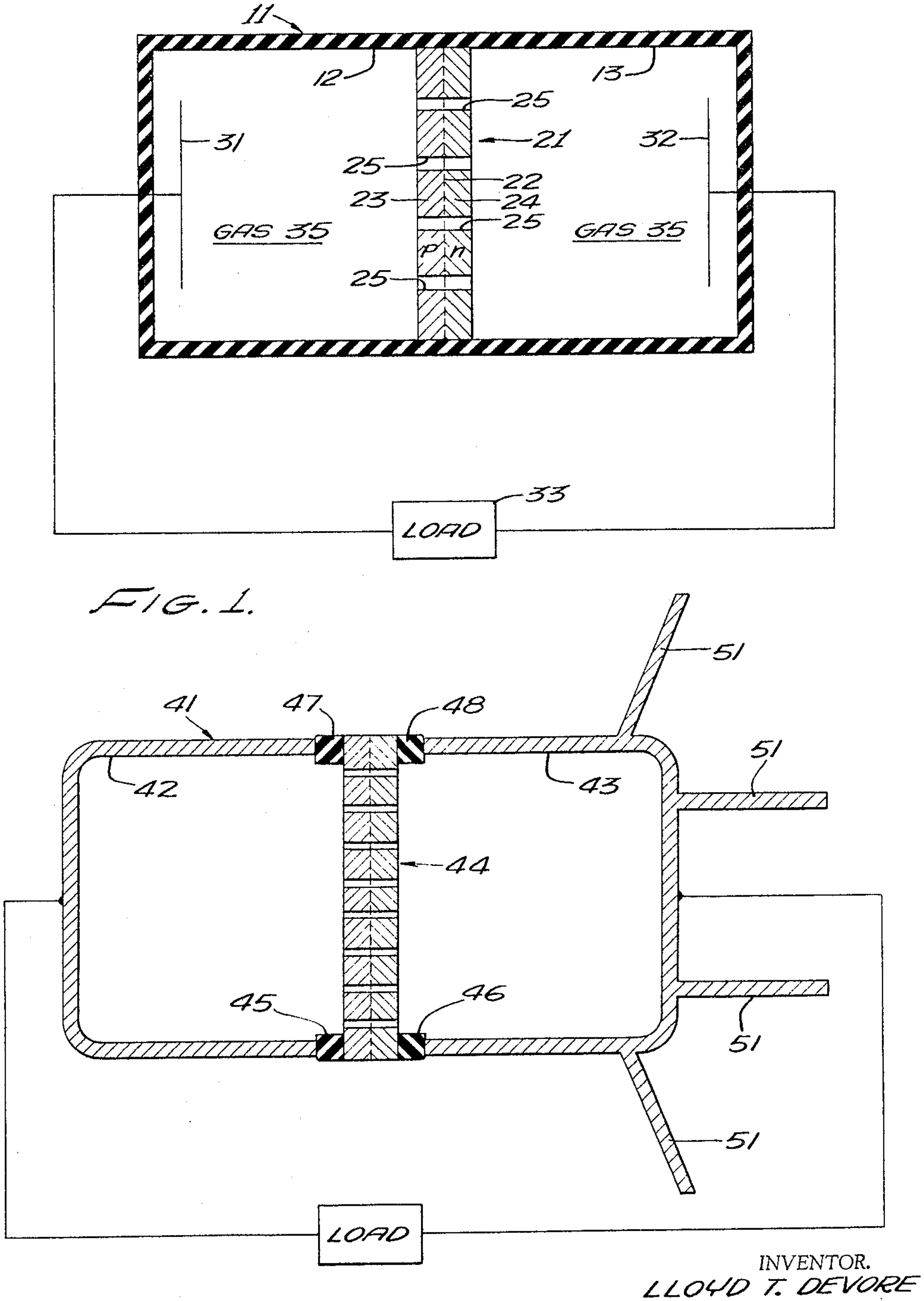
FIGURE 1 is a cross-sectional view of a gaseous thermocouple in accordance with the present invention.
FIGURE 2 is a cross-sectional view of an additional embodiment of the present invention.

Referring now to the drawings, FIGURE 1 shows ceramic or quartz chamber 11 divided into compartments 12 and 13 by cadmium sulfide or silicon semiconductor 21. Semiconductor 21 contains p-n junction 22 separating p-type region 23 and n-type region 24, and is about $\frac{1}{32}$ of an inch thick.

Semiconductor 21 is pierced by numerous small perforations or holes 25, which should have an effective diameter of about $10^{-5}$ centimeters. The holes, which permit the passage of ions through the semiconductor, must be sufficiently small in diameter to allow adequate fringing of the junction fields into the perforations. Semiconductor 21 can be made by techniques well known in the semiconductor art. The hole pattern can be drilled in the semiconductor by an electron beam such as that produced by the Carl Zeiss Electron-Beam Milling Machine, in which case the effective porosity can be pre-established as desired.

Compartments 12 and 13 contain electrodes 31 and 32, respectively, which are externally connected to load 33. Electrode 31, which serves as an electron collector, should have a high work function, and can be made of tungsten. Electrode 32, which serves as an ion collector, should have a low work function, and can be made of molybdenum or tantalum coated with barium oxide. Compartments 12 and 13 contain an easily ionized gas 35 of an alkali metal, such as cesium metal vapor. The gas pressure should be low enough to minimize wasteful collisions between ions and gas molecules and between ions and free electrons before the charged particles reach the desired collecting electrodes. That is, the gas pressure should be approximately that which provides a mean free path about as long as the distance between electrode 31 and semiconductor 21.

The realization of significant currents with practical sized equipment, however, may demand higher gas pressures, so that losses due to collisions can be tolerated. Thus, a sacrifice of efficiency is tolerable in order to use equipment that is not too large. The losses caused by electrical ionic recombination are in fact compensated for, because the smaller equipment results in reduced thermal radiation losses.

In operation, compartment 12 will be hotter than compartment 13, as by having concentrated solar energy fall only on compartment 12, or by using a flame, a nuclear heat source, or a radioactive heat source. Hot compartment 12 will contain positive ions, electrons, and atoms of cesium gas. P-type region 23, being negatively charged and the surface of semiconductor 21 facing the hot side of chamber 11, will accelerate positive ions toward itself. Since semiconductor 21 is highly perforated, some of the ions will pass into holes 25 and will be retarded upon approaching n-type region 24. The ions, however, will have enough kinetic thermal energy to pass through the holes. After they pass through, the repelling force from n-type region 24 will accelerate the ions toward collecting electrode 32, where an electron will be extracted from the low electron work function surface, producing a free or neutral atom.

Ions can move through semiconductor 21 only in the direction from the hot toward the cold electrode. Neutral atoms may pass through semiconductor 21 in either direction. When equilibrium is established, the number of ions moving from the hot compartment to the cold compartment must be equal to the number of neutral atoms returning.

The electrons that are liberated in compartment 12, wherein the positive ions were formed, are repelled by the negative charge on p-type region 23 and are forced to collecting electrode 31. The electrons then pass into the external circuit and through load 33 to electrode 32 on the cool side of chamber 11.

Chamber 11 can also be used as a photoelectric device, in which case the walls of compartment 12 should be made transparent to the radiation to be detected or utilized. At low temperatures, the walls of compartment 12 could be made of glass, quartz or sapphire. The gas pressure would be related to the maximum effect desired at the intended temperature and would be below atmospheric pressure. When chamber 11 is used as a photoelectric device, the gas filling should be ionizable at the desired wave length. In some installations, the unit will be hot enough to establish the proper vapor pressure for an alkali metal. The vapor can then be used to sense the ionizing radiation. With a suitable gas filling, the device will even respond to high energy radiation such as X-rays, gamma rays and penetrating beta rays. Under such conditions, the slight voltage change at collector electrode 32 can be amplified to give an indication of the energy incident upon the gas sensing portion of the device.

FIGURE 2 shows another possible configuration for the chamber. Chamber 41 is divided into compartments 42 and 43 by semiconductor 44. The walls of compartments 42 and 43 are made of refractory metal, thereby dispensing with the necessity for collector electrodes 31 and 32 of FIGURE 1. The walls of compartments 42 and 43 function as electrodes. Insulation rings 45, 46, 47 and 48 are provided to electrically isolate semiconductor 44 from chamber 41. The insulation rings can be made of any dielectric material such as sapphire, ceramic or quartz. Cooling fins 51 may be provided as needed.

The metals used for chamber 41 depend upon the application. In outer space, in the absence of surrounding atmosphere, any gas-tight metal that is resistant to the temperatures employed, such as tungsten, may be used. For conditions where a combustion flame would impinge upon compartment 42, at least the external surface of the walls of compartment 42 should be protected from the chemical effects of the flame. Coatings of molybdenum silicide, titanium nitride, silicon nitride or aluminum oxide may be used. Similar considerations apply to compartment 43, but in addition, the inside surface of the walls of compartment 43 should have a low-electron work function surface, such as barium oxide.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A gaseous thermocouple comprising: a chamber divided into first and second compartments by a semiconductor having p-type and n-type regions separated by a p-n junction, said semiconductor being pierced by a plurality of perforations, and said semiconductor being sufficiently thin to permit the passage of positive ions through said perforations; an easily ionizable gas in each of said first and second compartments; first and second electrode surfaces in said first and second compartments, respectively; and means for coupling each electrode surface to an external load.

2. The apparatus of claim 1 wherein said perforations are sufficiently small in diameter to allow adequate fringing of the junction fields into said perforations.

3. Apparatus as defined in claim 1 in which said gas is cesium metal vapor.

4. Apparatus as defined in claim 3 in which said gas is maintained at a pressure sufficiently low to minimize wasteful collisons between ions and gas molecules and between ions and free electrons in said compartments.

5. A gaseous thermocouple comprising: a chamber divided into first and second compartments by a semiconductor having first and second-type conductivity regions separated by a p-n junction, each of said compartments including an electrode surface, and said semiconductor being pierced by a plurality of perforations; said semiconductor being sufficiently thin to permit the passage of ions through said perforations; means for coupling each of said electrode surfaces to an external load; and an ionizable gas in said first and second compartments.

6. Apparatus as defined in claim 5 in which said first-type conductivity region is n-type and said second-type conductivity region is p-type.

References Cited by the Examiner

UNITED STATES PATENTS

| | | | |
|---|---|---|---|
| 2,696,564 | 12/1954 | Ohmart | 310—3 X |
| 2,870,344 | 1/1959 | Brattain. | |

MILTON O. HIRSHFIELD, *Primary Examiner.*

GEORGE WESTBY, *Examiner.*

DAVID X. SLINEY, L. ZALMAN, *Assistant Examiners.*